United States Patent
Gupta et al.

(10) Patent No.: US 12,353,300 B1
(45) Date of Patent: Jul. 8, 2025

(54) FILESYSTEM RECOVERY AND INDEXING WITHIN A USER SPACE

(71) Applicant: Rubrik, Inc., Palo Alto, CA (US)

(72) Inventors: Anshul Mohan Gupta, San Jose, CA (US); Takeshi Suzuki, Mountain View, CA (US); Lewi Abseno, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/761,186

(22) Filed: Jul. 1, 2024

(51) Int. Cl.
*G06F 11/14* (2006.01)

(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 10,409,687 B1* | 9/2019 | Bono | G06F 11/1451 |
| 2018/0285210 A1* | 10/2018 | Mitkar | G06F 11/324 |
| 2019/0278669 A1* | 9/2019 | Mueller-Wicke | G06F 16/176 |
| 2020/0409797 A1* | 12/2020 | Mathew | G06F 9/45558 |
| 2020/0409921 A1* | 12/2020 | Starks | G06F 9/44557 |
| 2021/0232344 A1* | 7/2021 | Corrie | G06F 8/63 |
| 2022/0222147 A1* | 7/2022 | Mitkar | G06F 11/2048 |
| 2023/0334029 A1* | 10/2023 | Prasad | G06F 16/219 |

\* cited by examiner

*Primary Examiner* — Eddy Cheung
(74) *Attorney, Agent, or Firm* — Holland & Hart LLP

(57) ABSTRACT

Methods, systems, and devices for data management are described. A data management system (DMS) may support backup and recovery of a filesystem. The DMS may, as part of the backup, obtain a snapshot of the filesystem. The DMS may mount the snapshot within a user space of a node of the DMS. The user space may be isolated from other processes that execute on the node of the DMS. The DMS may generate, within the user space based on the mounted snapshot, index files that index the filesystem. In response to a subsequent request to access one or more files, the DMS may retrieve the one or more files from the snapshot mounted in the user space based on the index files.

20 Claims, 10 Drawing Sheets

FILESYSTEM RECOVERY AND INDEXING WITHIN A USER SPACE

FIELD OF TECHNOLOGY

The present disclosure relates generally to data management, including techniques for filesystem recovery and indexing within a user space.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, filesystems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may obtain one or more snapshots of a filesystem (e.g., as hosted by a virtual machine (VM) or elsewhere). The DMS may index the snapshots to make the files and directories of the filesystem accessible to (e.g., viewable or recoverable by) a user. In some systems, the DMS may mount the filesystem directly on a storage node of the DMS to perform indexing. However, if the filesystem is corrupt or the indexing process crashes, the entire DMS node may be negatively impacted, which may adversely impact backup and recovery operations by the DMS. Additionally, in some examples, the DMS may index the snapshot using a mount-based indexing process. For example, the DMS may iterate over the mounted snapshot to generate index information, which may be relatively slow.

Techniques described herein provide for the DMS to perform snapshot processing within a user space. The user space may represent a kernel or other process that is isolated from other processes and resources on the node of the DMS. As such, if the filesystem is corrupt or the indexing process crashes, the associated impact may be contained within the isolated user space, and may not affect other aspects (e.g., processes or components) of the DMS. Processing the snapshot in the user space may include the DMS mounting the snapshot to the user space and performing mount-based indexing of the snapshot or generating a loop device within the user space to read index information directly from the mount of the snapshot. Once the snapshot is processed within the user space, the DMS may provide the indexed information to a user. The user may thereby review and select one or more time points, files, or the like to recover based on the index information.

Figure 1:
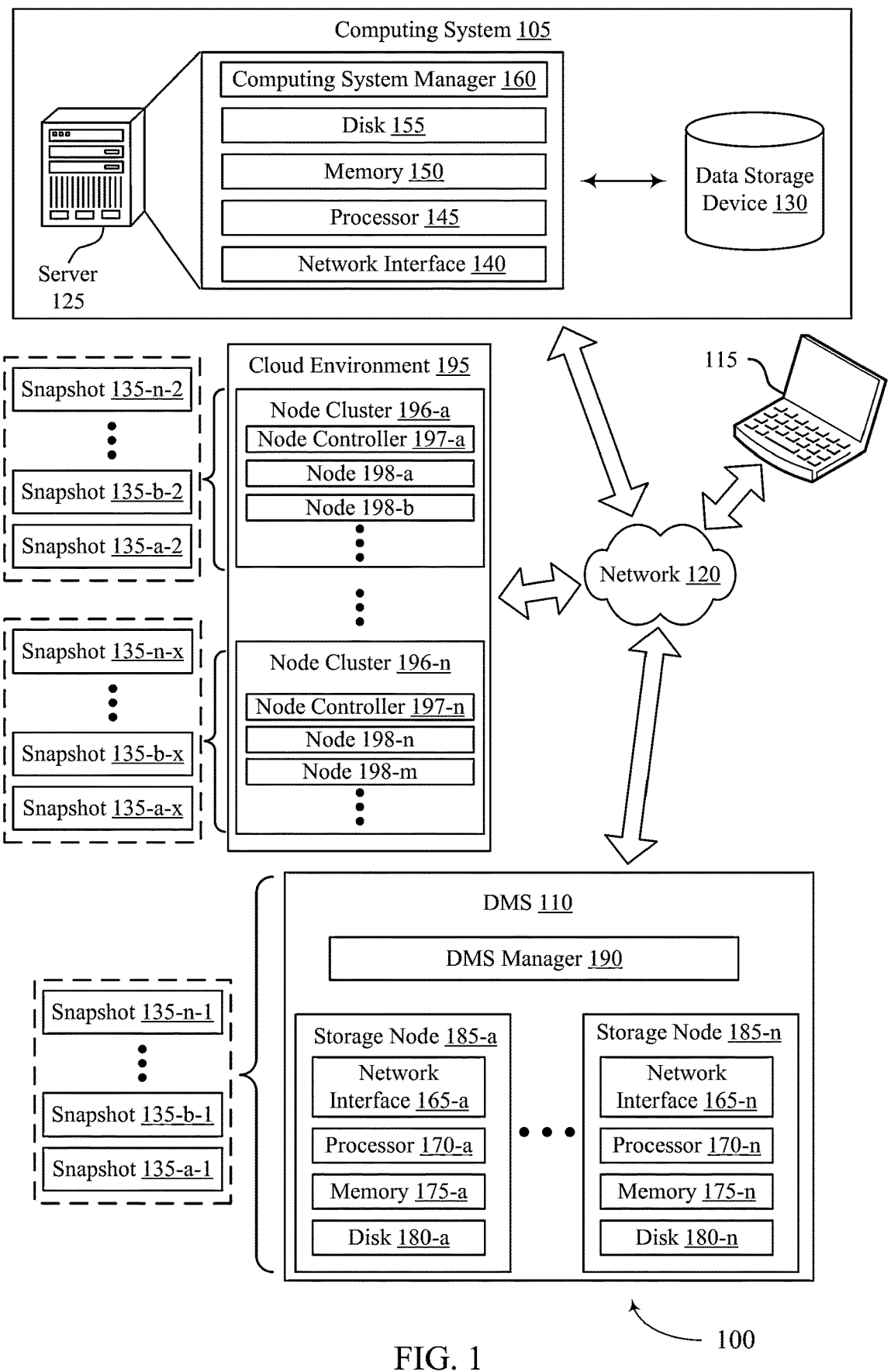
FIG. 1 illustrates an example of a computing environment that supports filesystem recovery and indexing within a user space in accordance with aspects of the present disclosure.

FIG. 1 illustrates an example of a computing environment 100 that supports filesystem recovery and indexing within a user space in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a VM). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more VMs, the resources of which are made available to one or more client devices over a network (e.g., to one or more computing devices 115 over the network 120).

In some examples, the computing system 105 or aspects thereof may implement or be implemented by one or more VMs. The one or more VMs may run various applications, such as a database server, an application server, or a web server. For example, a server 125 may be used to host (e.g., create, manage) one or more VMs, and the computing system manager 160 may manage a virtualized infrastructure within the computing system 105 and perform management operations associated with the virtualized infrastructure. The computing system manager 160 may manage the provisioning of VMs running within the virtualized infrastructure and provide an interface to a computing device 115 interacting with the virtualized infrastructure. For example, the computing system manager 160 may be or include a hypervisor and may perform various VM-related tasks, such as cloning VMs, creating new VMs, monitoring the state of VMs, moving VMs between physical hosts for load balancing purposes, and facilitating backups of VMs. In some examples, the VMs, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a VM, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, VMs, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may index one or more snapshots make files and directories of a filesystem associated with the snapshot 135 accessible to (e.g., viewable or recoverable by) a user. In some systems, the DMS 110 may mount the filesystem directly on a storage node 185 of the DMS 110 to perform indexing. However, if the filesystem is corrupt or the indexing process crashes, the entire storage node 185 of the DMS 110 may be negatively impacted, which may adversely impact backup and recovery operations by the DMS 110. Additionally, in some examples, the DMS 110 may index the snapshot using a mount-based indexing process. For example, the DMS 110 may iterate over the mounted snapshot to generate index information, which may be relatively slow.

Techniques described herein provide for the DMS 110 to perform snapshot processing within a user space of the DMS 110. The user space may represent a kernel or other process that is isolated from other processes and resources on a node of the DMS 110 (e.g., one of the storage nodes 185, or some other node). As such, if the filesystem is corrupt or the indexing process crashes, the associated impact may be contained within the isolated user space, and may not affect other aspects (e.g., processes or components) of the DMS 110. Processing the snapshot 135 in the user space may include the DMS 110 mounting the snapshot 135 to the user space and performing mount-based indexing of the snapshot 135 or generating a loop device within the user space to read index information directly from the mount of the snapshot 135. Once the snapshot is processed within the user space, the DMS 110 may provide the indexed information to a user. The user may thereby review and select one or more time points, files, or the like to recover based on the index information.

Figure 2:
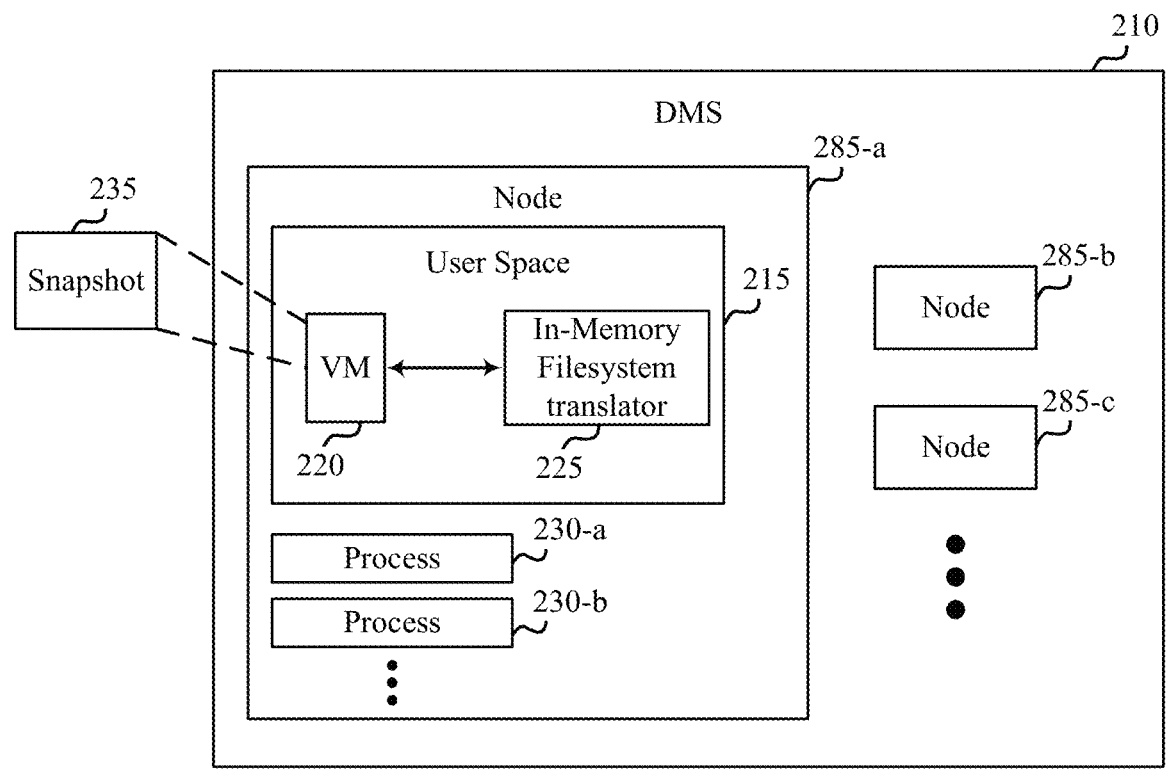
FIG. 2 shows an example of a computing environment that supports filesystem recovery and indexing within a user space in accordance with aspects of the present disclosure.

FIG. 2 shows an example of a computing environment 200 that supports filesystem recovery and indexing within a user space in accordance with aspects of the present disclosure. The computing environment 200 may implement or be implemented by aspects of the computing environment 100 as described with reference to FIG. 1. For example, the computing environment 200 illustrates a DMS 210, which may represent an example of a DMS 110 as described with reference to FIG. 1. As described herein, the DMS 210 may mount a snapshot 235 within a user space 215 of a node 285-*a* of the DMS 210 to perform efficient and reliable indexing of the snapshot 235. The snapshot 235 may represent an example of a snapshot 135 as described with reference to FIG. 1, and the nodes 285 may represent examples of the storage nodes 185, as described with reference to FIG. 1.

The DMS 210 may manage backup and recovery of data for one or more client databases or other client systems. The DMS 210 may obtain snapshots 235 of the client data over time, and may store the snapshots 235 at the DMS 210 or some other location. For example, the DMS 210 may store the snapshots 235 in one or more of the nodes 285 of the DMS 210. The DMS 210 may include one or multiple nodes 285, such as the nodes 285-*a*, 285-*b*, and 285-*c* illustrated in FIG. 2. The snapshots 235 may be accessed and used to recovery the client's data to a certain point-in-time.

As described with reference to FIG. 1, each node 285 of the DMS 210 may include one or more processors, controllers, interfaces, disks, memory, or the like for execution of various processes 230, such as the processes 230-*a* and 230-*b* executed on the node 285-*a*. In some examples, a node 285 may include a user space 215. The user space 215 may be a kernel or other process (e.g., a set of code to be executed) that is isolated from other processes 230 and resources on the node 285-*a* of the DMS 210. That is, the user space 215 may represent an example of code that is run within an isolated process within the node 285-*a*.

Techniques described herein provide for the DMS 210 to process one or more snapshots 235 within the user space 215 of a node 285, such as the node 285-*a*. The DMS 210 may mount the one or more snapshots 235 to the user space 215 and perform processing, such as indexing of the snapshots 235, within the user space 215 to improve efficiency and reduce overhead as compared with systems in which the snapshot is indexed in an external storage location. Additionally, or alternatively, processing of the snapshot 235 mounted within the user space 215 may improve reliability as compared with systems in which the snapshot 235 is processed in another location on the node 285-*a* that is not isolated from the other processes 230, at least because the isolation of the user space 215 may protect the other processes 230 if there is a failure of the snapshot 235.

The DMS 210 may obtain the snapshot 235, which may be a snapshot of a filesystem, a VM, or some other type of data. The DMS 210 may generate a merged journal file (MJF) that represents one or more disks of the filesystem or the VM based on the snapshot 235. The DMS 210 may generate the VM 220 (e.g., a VM appliance, such as a QEMU appliance), within the user space 215. The VM 220 may represent an example of an appliance configured to execute one or more disk files. In some examples, an image of the VM 220, including a kernel, may be static (e.g., pre-created) on the node 285-*a*. A hypervisor may obtain the image of the VM 220 and use the image to create the VM 220 in the user space 215. The DMS 210 may mount the snapshot 235 to the user space 215 by mounting, based on the MJF, the snapshot 235 to the VM 220, such that the VM 220 may execute the corresponding disk files associated with the snapshot 235. The snapshot 235 may thereby be available (e.g., accessible, viewable) within the user space 215, but may remain stored at its previous storage location.

The snapshot 235 may be mounted within the user space 215 using one or more library functions (e.g., a libguestfs library, or some other type of library). The library functions may be associated with a kernel that runs within the VM 220, such that these functions may be isolated from the other processes 230 of the DMS 210. As such, the mounting of a corrupted filesystem may not impact operation of the processes 230-*a* and 230-*b* of the node 285-*a*. The one or more library functions may be associated with one or more first application programming interfaces (APIs) that support a first format for access to and modification of disk images mounted to the VM 220. The DMS 210 may thereby utilize the one or more library functions to mount the snapshot 235 to the VM 220 in the user space 215.

Once the snapshot 235 is mounted within the user space 215, the DMS 210 may either identify and expose one or more mount points associated with the snapshot 235 or translate a second format of access operations that is usable by remaining processes 230 and nodes 285 within the DMS 210 to the first format of the mounted snapshot 235, such that a user may access or otherwise recover one or more files within the snapshot 235 as mounted to the user space 215. Techniques for exposing mount points are described in further detail elsewhere herein, including with reference to FIG. 3.

To translate formats for accessing the mounted snapshot 235, the DMS 210 may, in some examples, generate an in-memory filesystem translator 225 within the user space 215. The in-memory filesystem translator 225 may be a filesystem itself or some other component configured to facilitate translation of access commands between a first format supported by the one or more first interfaces (e.g., APIs) configured to facilitate the mount of the snapshot 235 to the VM 220 and a second format supported by one or more other interfaces (e.g., APIs) associated with the filesystem or other processes 230 or components within the node 285-*a*. For example, a second format (e.g., a portable operating system interface (POSIX)-compliant format) of the filesystem may be used by the DMS 210 and the user to access and identify requested files (e.g., to retrieve, recover, etc.), and the second format may not be compatible (e.g., one-to-one mapped) with the operations that are supported by the library functions used to mount the snapshot 235 to the VM 220, which may be associated with the first format. The DMS 210 may thereby generate the in-memory filesystem translator 225 to facilitate a translation between these two formats so that the DMS 210 may reliably access and recover files using the snapshot 235 as mounted.

The in-memory filesystem translator 225 may thereby be configured to support a translation layer between calls from external to the user space 215 and the VM 220 including the mounted snapshot 235. In some examples, the in-memory filesystem translator 225 may be a filesystem itself that includes mapping information for mapping external calls having the second format (e.g., POSIX-compliant calls) to access calls, commands or operations for the VM 220 having the first format (e.g., libguestfs, or some other format that facilitates the mounting of the snapshot 235 to the VM 220).

The DMS 210 may thereby mount the snapshot 235 within the user space 215 of the node 285-*a*, such that the snapshot 235 is isolated from any other processes 230 that execute at the node 285-*a*. By performing such mounting using code that executes within the user space 215, there may be reduced risk of the snapshot 235 or the mount process interfering with other processes that execute on the node 285-*a*. The DMS 210 may further utilize the in-memory filesystem translator 225 or exposed mount points to access the mounted snapshot 235 based on requests from a user, such that the DMS 210 may retrieve or otherwise recover files backed up by the snapshot 235.

The DMS 210 may process the snapshot 235 while mounted within the user space 215. The processing may include, for example, indexing the snapshot 235 so that the snapshot 235 may be accessible in a relatively efficient manner. The DMS 210 may generate one or more index files that index the filesystem via a scanning method, a block-based indexing method, or some other indexing method. In some examples, the DMS 210 may scan the snapshot 235 within the user space 215. Scanning the snapshot 235 may include reading all or most of the files of the filesystem. The DMS 210 may utilize the direct mount points or the translation layer to access and read the snapshot 235 within the user space 215. The DMS 210 may retrieve metadata from the files of the snapshot based on the scanning. The metadata may include index information for the filesystem. For example, the metadata may include information associated with types of data stored in the filesystem, a location of files in the filesystem, a size of files in the filesystem, other index information, or any combination thereof. The DMS 210 may generate the one or more index files based on the metadata including the index information.

In some other examples, the DMS 210 may support a block-based indexing method. In such examples, the DMS 210 may read a subset of blocks or index nodes within the snapshot 235 (e.g., super blocks or super inodes). The DMS 210 may refrain from (e.g., skip) reading other files in the snapshot 235 different from the subset of blocks. The subset of blocks may include blocks that store the index information (e.g., metadata) for the filesystem. The DMS 210 may thereby perform a relatively efficient read of the snapshot 235 to obtain the index information. The subset of blocks may be dispersed sparsely throughout the snapshot 235. For example, each block of the subset of blocks may be associated with (e.g., may include index information for) a sequence or set of consecutive blocks of data.

The DMS 210 may store the one or more index files in memory (e.g., at the DMS 210 or some other storage location) and may utilize the index files to efficiently access the filesystem via the snapshot 235 as mounted within the user space 215 in response to requests from a user.

Figure 3:
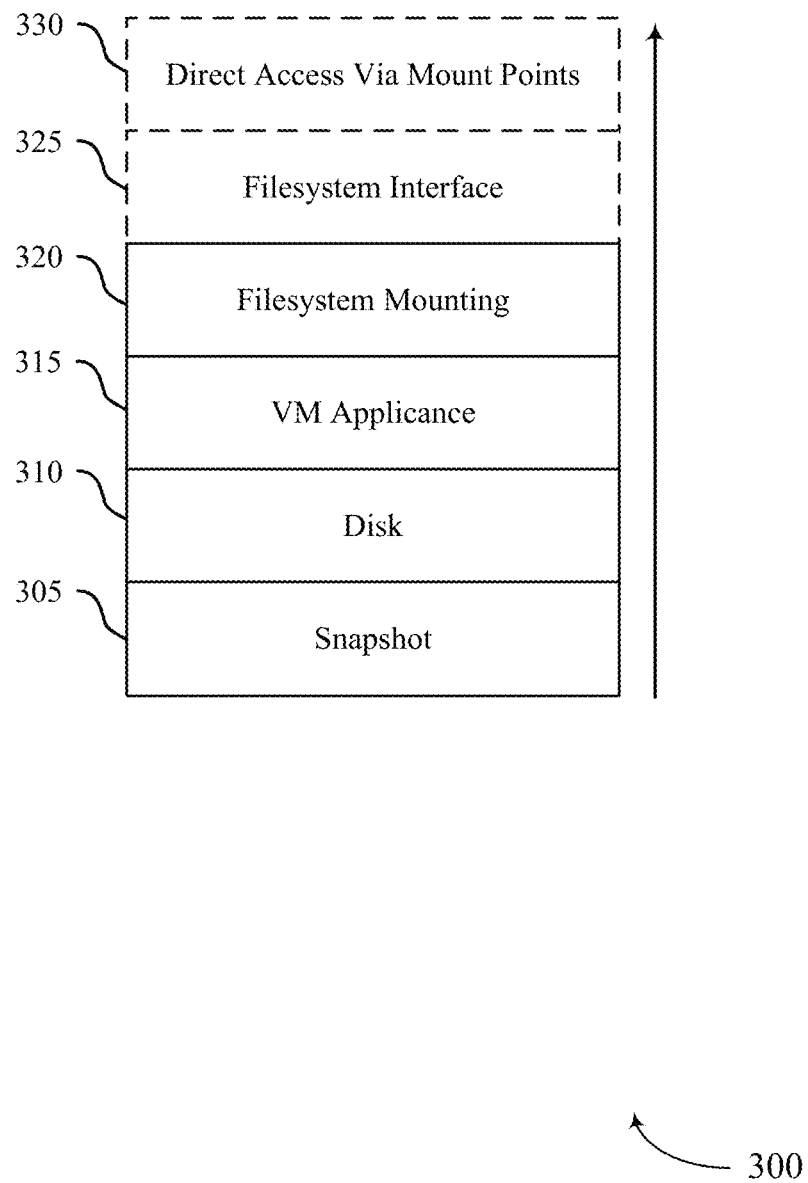
FIG. 3 shows an example of a system architecture stack that supports filesystem recovery and indexing within a user space in accordance with aspects of the present disclosure.

FIG. 3 shows an example of a system architecture stack 300 that supports filesystem recovery and indexing within a user space in accordance with aspects of the present disclosure. The system architecture stack 300 may implement or be implemented by aspects of the computing environments 100 and 200 as described with reference to FIGS. 1 and 2. The system architecture stack 300 illustrates various levels within a mount stack used for mounting a snapshot within a user space of a node of a DMS, as described with reference to FIGS. 1 and 2.

As described herein, during the process of obtaining and mounting a snapshot, there may be varying levels of accessibility to the snapshot, which may be examples of exposure, to the DMS and corresponding users of the DMS, of the snapshot and the files that are backed up by the snapshot. The levels may be associated with reduced processing for accessibility as the levels increase within the system architecture stack 300, as shown by the arrow in FIG. 3, which points to reduced processing and increased accessibility. For example, at the sixth level 330 of the system architecture stack 300, the files within the filesystem may be accessible to the DMS and a corresponding user with the least amount of processing by the DMS. However, lower levels in the system architecture stack 300 may be associated with more direct access to data and reduced latency (e.g., faster access times).

A first level 305 may include the snapshot itself. For example, the DMS may obtain a snapshot of a filesystem, and the snapshot may include backup information that directly identifies and defines files within the filesystem at a time at which the snapshot is obtained.

A second level 310 may be associated with one or more physical disk files within the snapshot. The disk files may be exposed in the form of an MJF or some other format. For example, after obtaining the snapshot, the DMS may generate an MJF that represents one or more disk files associated with the snapshot. A third level 315 may be associated with a VM appliance. As described with reference to FIG. 2, the DMS may generate a VM appliance configured to execute within an isolated user space in a node of the DMS. The VM appliance may execute the disk files from the second level 310.

A fourth level 320 may be associated with the filesystem mounted on the VM appliance in the user space. For example, the DMS (e.g., filesystem mounting logic using one or more mounting library functions) may utilize one or more interfaces associated with the VM appliance to mount the snapshot of the filesystem to the VM appliance using the one or more disk images associated with the second level 310.

As described with reference to FIG. 2, the DMS may utilize a set of library functions and one or more mount APIs to facilitate the mounting within the user space. In some examples, the DMS may identify mount points for mounting the snapshot of the filesystem based on a random mount process. For example, the DMS may mount devices associated with the snapshot randomly within the user space (e.g., according to a random sequence, at random mount points). The DMS may access the devices after the mounting. The DMS may retrieve, from at least one device after the random mount, metadata that indicates a correct mount point for information associated with the at least one device. The DMS may thereby re-mount the snapshot including the device and one or more other devices based on the metadata that indicates the accurate mount points. In some examples, the DMS may store the accurate mount points within a cache or other storage location based on the re-mounting.

In some examples, if the DMS has already identified mount points for one or more devices included in the snapshot, the DMS may retrieve the one or more mount points from a cache of the DMS or some other storage location. The one or more mount points may indicate locations of paths associated with files of the filesystem that are included in the snapshot. The DMS may thereby mount the snapshot using the retrieved mount points.

After mounting the snapshot of the filesystem to the VM appliance, the DMS may either transition to the fifth level 325 or the sixth level 330 to make the filesystem accessible to the DMS and user. The fifth level 325 may be associated with an in-memory filesystem translator, as described with reference to FIG. 2, and which may be referred to as a filesystem interface in some examples. For example, at the fifth level 325, the DMS may access the files within the snapshot by transmitting, to the filesystem format translator, one or more requests to access the files. The requests may be associated with a second format supported by the DMS and a filesystem interface (e.g., a POSIX-compliant format). The in-memory filesystem format translator may translate the one or more requests from the second format to a first format supported by the mounted snapshot and corresponding APIs that facilitate the mounting. The DMS may thereby access the filesystem using the described translation layer.

The sixth level 330 may, in some examples, be used in addition to or as an alternative to the fifth level 325. The sixth level 330 may be associated with direct access, by the DMS, to one or more mount points of the mounted snapshot. The DMS may thereby access the filesystem as if the filesystem is mounted locally on the node of the DMS. In this example, instead of utilizing the translation layer to access the filesystem, the user space may expose the mount points to the DMS, such that the DMS may directly access the exposed mount points to identify locations of files within the filesystem. In some examples, the DMS may utilize one or more APIs associated with the first format used by the mounting appliance to further access the data within the filesystem. As such, the direct access via mount points may additionally resemble an in-memory filesystem. Access using the filesystem interface and translation layer may be faster than access using the exposed mount points, which go through a fuse library. However, the exposed mount points may provide for more reliable and direct access.

Once the DMS has traversed through the system architecture stack 300, the DMS may be able to access the filesystem via the snapshot mounted to the user space. The DMS may subsequently generate index information for indexing the filesystem based on the snapshot, and may retrieve and/or recover one or more files based on requests from a user, as described in further detail elsewhere herein, including with reference to FIGS. 2 and 4.

Figure 4:
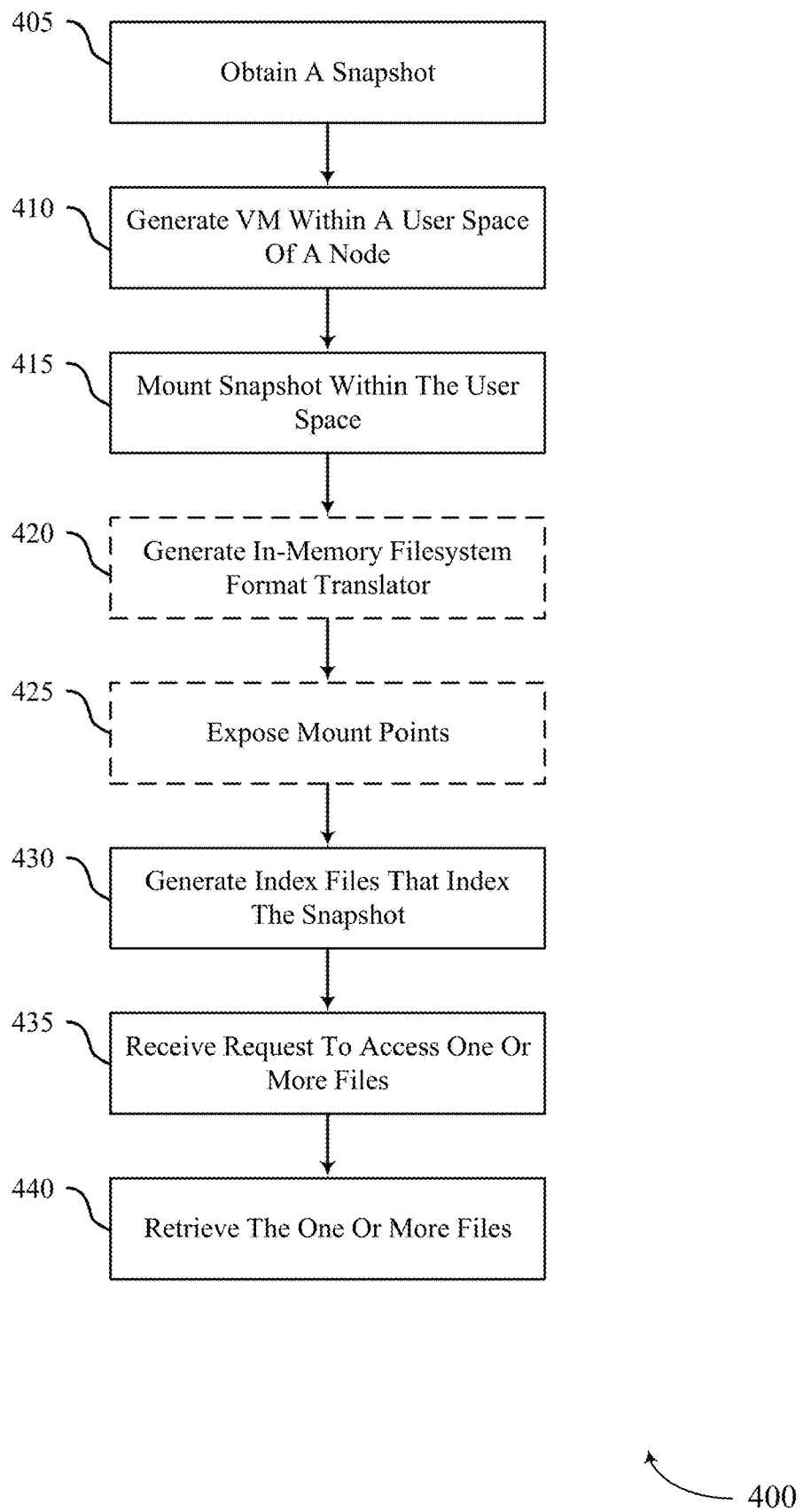
FIG. 4 shows an example of a flow diagram that supports filesystem recovery and indexing within a user space in accordance with aspects of the present disclosure.

FIG. 4 shows an example of a flow diagram 400 that supports filesystem recovery and indexing within a user space in accordance with aspects of the present disclosure. The flow diagram 400 may implement or be implemented by aspects of the computing environments 100 and 200 and the system architecture stack 300, as described with reference to FIGS. 1-3. For example, the flow diagram 400 may be implemented by a DMS, which may represent an example of a corresponding DMS as described with reference to FIGS. 1-3. As described herein, the DMS may process a snapshot within an isolated kernel (e.g., a user space) within a node of the DMS, so as to reduce interference or effects of the snapshot processing on other processes and nodes in the DMS.

In some aspects, the operations illustrated in the flow diagram 400 may be performed by hardware (e.g., including circuitry, processing blocks, logic components, and other components), code (e.g., software or firmware) executed by a processor, or any combination thereof. For example, aspects of the flow diagram 400 may be implemented or managed by a DMS, a user space mount manager 520, a controller, some other software or application that is associated with data backup and recovery, or any combination thereof.

At 405, the DMS may obtain a snapshot of a filesystem. The DMS may support backup and recovery of the filesystem by obtaining the snapshot and one or more other snapshots of the filesystem over time. The snapshots may subsequently be used to recover the filesystem in a disaster scenario or to a certain point-in-time version of the filesystem.

At 410, in some examples, the DMS may generate a VM within a user space of a node of the DMS. The DMS may generate the VM before obtaining the snapshot or based on obtaining the snapshot. The VM may represent an example of the VM 220 described with reference to FIG. 2 or the third level 315 in FIG. 3. For example, the VM may be a VM appliance (e.g., QEMU) within the user space that may be configured to execute one or more physical disk files within the snapshot. The one or more disk files may be associated with a second VM that is located elsewhere in the DMS or some other storage location and executes the filesystem. The snapshot may include a copy or information that is representative of the disk files. The user space may be a kernel or other process within the node of the DMS that is isolated from other processes and resources within the DMS.

At 415, the DMS may mount the snapshot within the user space of the node. The DMS may, for example, mount the snapshot to the VM appliance generated at 410. In some examples, the DMS may utilize one or more APIs and a corresponding function library having a first format to execute the mount of the snapshot within the user space. The DMS may mount the snapshot using a random sequence of mount points first, or using mount points that are identified based on mount metadata stored in a cache of the DMS, as described in further detail elsewhere herein, including with reference to FIGS. 2 and 3.

At 420, in some examples, the DMS may generate an in-memory filesystem format translator. The in-memory filesystem format translator may represent an example of the in-memory filesystem translator 225 described with reference to FIG. 2 or the fifth level 325 described with reference to FIG. 3. For example, the in-memory filesystem format translator may be configured to translate a second format supported by the filesystem and a user of the DMS to the first format of the snapshot as mounted within the user space, or vice versa. The in-memory filesystem format translator may thereby be configured to provide the DMS with access to the snapshot as mounted within the user space.

At 425, in some examples, the DMS may expose one or more mount points associated with the snapshot as mounted in the user space. For example, in addition to, or as an alternative to, generating the in-memory filesystem format translator, the DMS may access, directly, one or more mount points that are exposed within the user space. The exposed mount points may indicate information associated with locations of files within the filesystem, and the like. The direct access via mount points may represent an example of the sixth level 330 as described with reference to FIG. 3.

At 430, the DMS may generate, within the user space, index files that index the filesystem as included in the snapshot mounted in the user space. The DMS may generate the index files based on having access to the snapshot either directly via the mount points or via the in-memory filesystem format translator. The DMS may generate the index files using a scanning indexing technique or a block-based indexing technique, as described in further detail elsewhere herein, including with reference to FIGS. 2 and 3.

At 435, the DMS may receive, from a user of the DMS via a user interface, a request to access one or more files within the filesystem. In some examples, the request may be to access a certain state of the one or more files at a time that is associated with the snapshot. Additionally, or alternatively, the request may be for recovery of the filesystem to a certain point-in-time associated with the snapshot. The request may be conveyed via a second format associated with accessing the filesystem.

At 440, based on the request, the DMS may retrieve or otherwise access the one or more requested files. The DMS may retrieve the one or more requested files by accessing, in accordance with the index information, the snapshot mounted in the user space. The DMS may, in some examples, access the exposed mount points directly using the index information to retrieve the requested files. The mount points and the index information may indicate a location of the requested files. Additionally, or alternatively, the DMS may transmit (e.g., from the node of the DMS or elsewhere in the DMS) one or more requests for access to the one or more files to the in-memory filesystem format translator. The one or more requests may be associated with the second format, and the in-memory filesystem format translator may translate the second format to a first format supported by interfaces used to mount the snapshot within the user space. The in-memory filesystem format translator may then utilize the requests in the first format as well as the index information to identify, access, and retrieve the requested files from the snapshot.

The DMS may thereby mount and process a snapshot within a user space of a node that is isolated from other processes within the DMS. By processing, indexing, and accessing the snapshot within the user space, the DMS may reduce a potential for the snapshot and corresponding filesystem to corrupt or otherwise interfere with any of the other processes by the DMS, such that the DMS may continue to maintain reliable backup and management of data for one or more clients. Although a single snapshot is described, it is to be understood that the DMS may similarly process any quantity of one or more snapshots within a user space or across multiple isolated user spaces on one or more nodes of the DMS.

Figure 5:
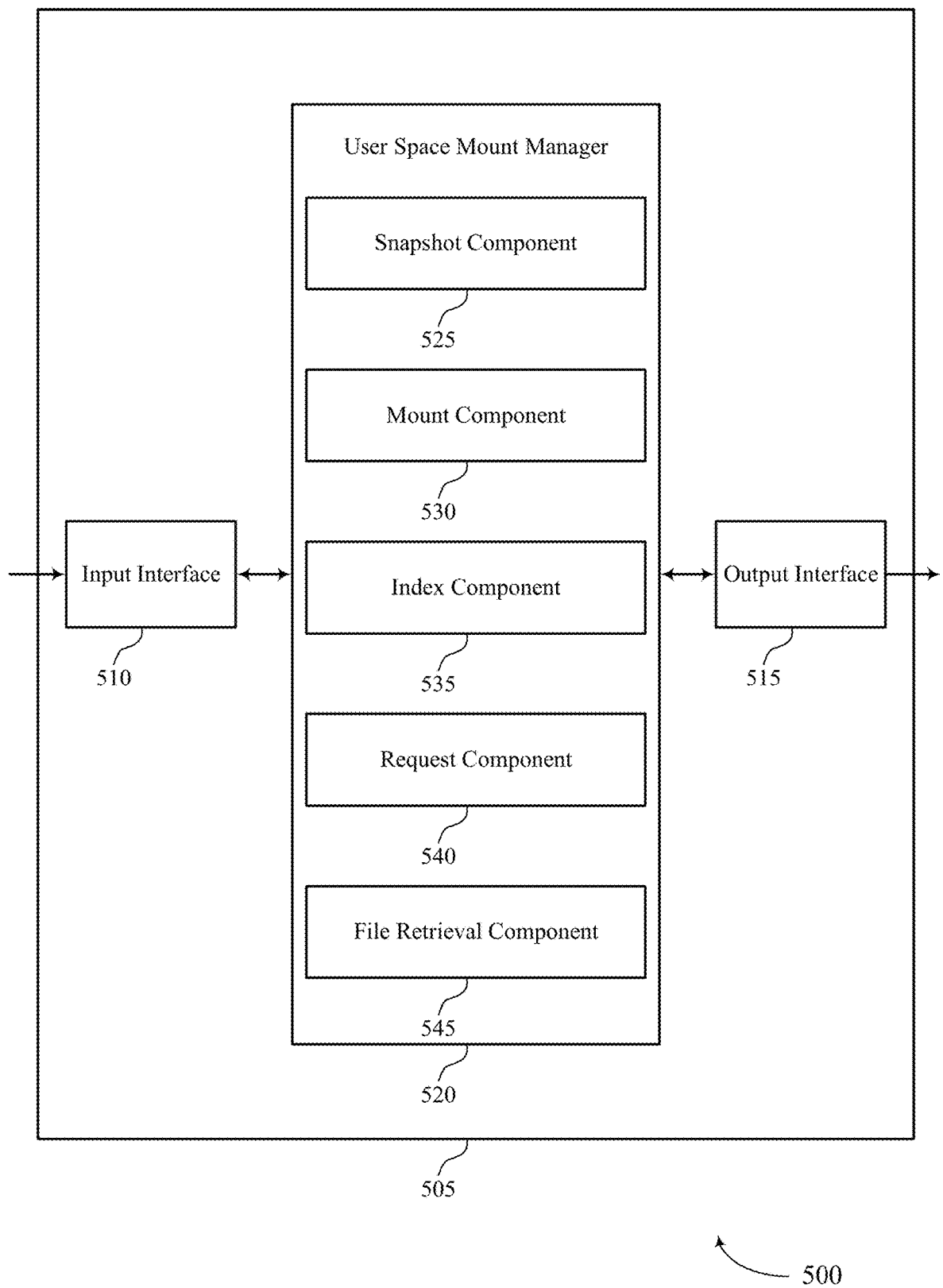
FIG. 5 shows a block diagram of an apparatus that supports filesystem recovery and indexing within a user space in accordance with aspects of the present disclosure.

FIG. 5 shows a block diagram 500 of a system 505 that supports filesystem recovery and indexing within a user space in accordance with aspects of the present disclosure. In some examples, the system 505 may be an example of aspects of one or more components described with reference to FIG. 1, such as a DMS 110. The system 505 may include an input interface 510, an output interface 515, and a user space mount manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the user space mount manager 520 to support filesystem recovery and indexing within a user space. In some cases, the input interface 510 may be a component of a network interface 725 as described with reference to FIG. 7.

The output interface 515 may manage output signaling for the system 505. For example, the output interface 515 may receive signaling from other components of the system 505, such as the user space mount manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the user space mount manager 520 may include a snapshot component 525, a mount component 530, an index component 535, a request component 540, a file retrieval component 545, or any combination thereof. In some examples, the user space mount manager 520, or various components thereof, may be configured to perform various operations (e.g., receiving, monitoring, transmitting) using or otherwise in cooperation with the input interface 510, the output interface 515, or both. For example, the user space mount manager 520 may receive information from the input interface 510, send information to the output interface 515, or be integrated in combination with the input interface 510, the output interface 515, or both to receive information, transmit information, or perform various other operations as described herein.

The snapshot component 525 may be configured as or otherwise support a means for obtaining, by a DMS, a snapshot of a filesystem, where the DMS supports backup and recovery of the filesystem based on the snapshot. The mount component 530 may be configured as or otherwise support a means for mounting, by the DMS, the snapshot within a user space of a node of the DMS, where the user space is isolated from one or more other processes that execute on the node of the DMS. The index component 535 may be configured as or otherwise support a means for generating, by the DMS within the user space and based on the snapshot mounted in the user space, one or more index files that index the filesystem. The request component 540 may be configured as or otherwise support a means for receiving, by the DMS, a request to access one or more files of the filesystem. The file retrieval component 545 may be configured as or otherwise support a means for retrieving, by the DMS, the one or more files indicated via the request from the snapshot based on the one or more index files.

Figure 6:
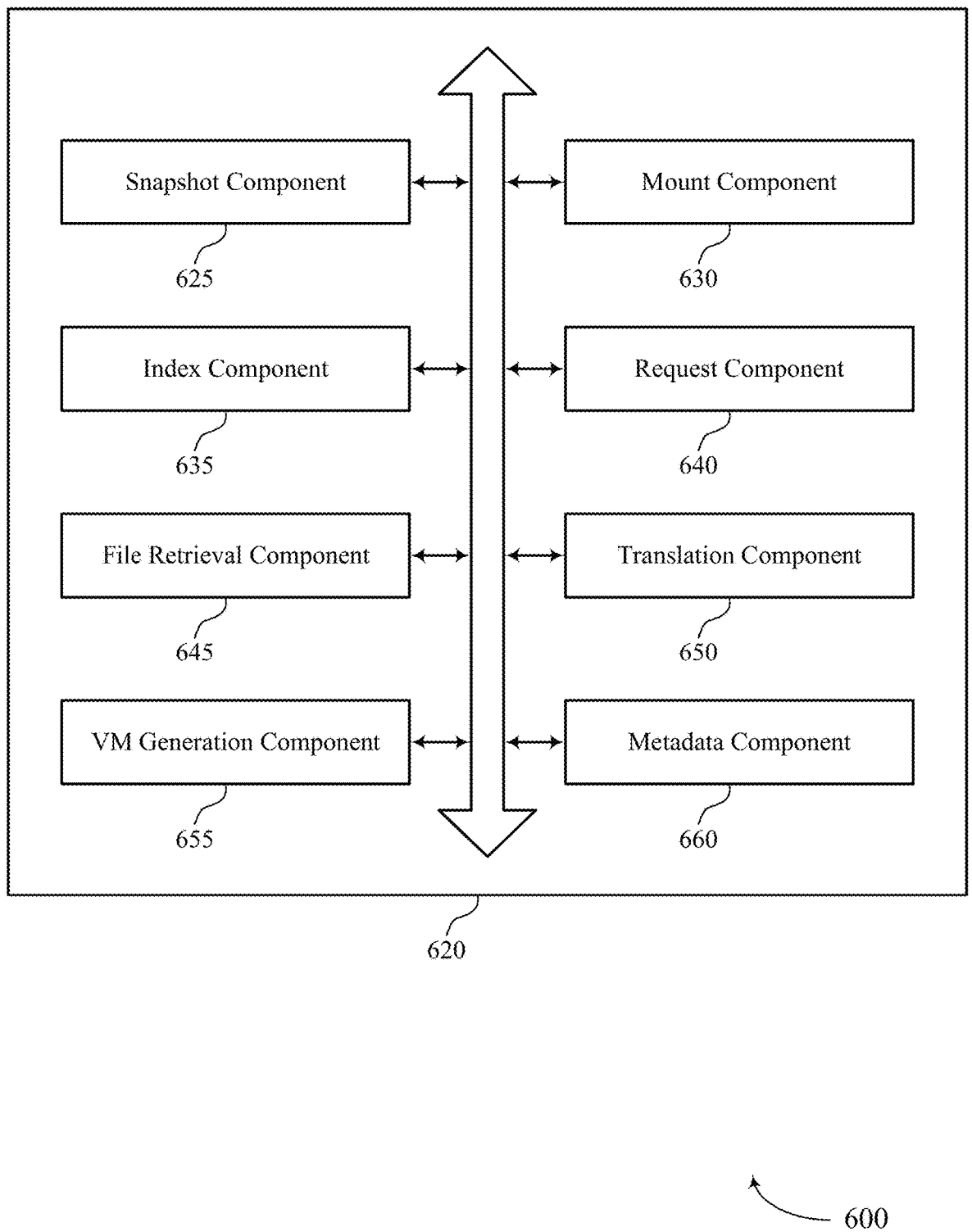
FIG. 6 shows a block diagram of a user space mount manager that supports filesystem recovery and indexing within a user space in accordance with aspects of the present disclosure.

FIG. 6 shows a block diagram 600 of a user space mount manager 620 that supports filesystem recovery and indexing within a user space in accordance with aspects of the present disclosure. The user space mount manager 620 may be an example of aspects of a user space mount manager 720 or a user space mount manager 520, or both, as described herein. The user space mount manager 620, or various components thereof, may be an example of means for performing various aspects of filesystem recovery and indexing within a user space as described herein. For example, the user space mount manager 620 may include a snapshot component 625, a mount component 630, an index component 635, a request component 640, a file retrieval component 645, a translation component 650, a VM generation component 655, a metadata component 660, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot component 625 may be configured as or otherwise support a means for obtaining, by a DMS, a snapshot of a filesystem, where the DMS supports backup and recovery of the filesystem based on the snapshot. The mount component 630 may be configured as or otherwise support a means for mounting, by the DMS, the snapshot within a user space of a node of the DMS, where the user space is isolated from one or more other processes that execute on the node of the DMS. The index component 635 may be configured as or otherwise support a means for generating, by the DMS within the user space and based on the snapshot mounted in the user space, one or more index files that index the filesystem. The request component 640 may be configured as or otherwise support a means for receiving, by the DMS, a request to access one or more files of the filesystem. The file retrieval component 645 may be configured as or otherwise support a means for retrieving, by the DMS, the one or more files indicated via the request from the snapshot based on the one or more index files.

In some examples, the translation component 650 may be configured as or otherwise support a means for generating, within the user space of the node of the DMS, an in-memory filesystem format translator based on mounting the snapshot within the user space, the in-memory filesystem format translator configured to translate a second format supported by a user of the DMS to a first format of the snapshot mounted within the user space.

In some examples, to support mounting the snapshot within the user space of the node of the DMS, the mount component 630 may be configured as or otherwise support a means for mounting the snapshot within the user space of the node of the DMS in accordance with one or more interfaces configured to facilitate the mounting, where the first format is associated with the one or more interfaces.

In some examples, to support retrieving the one or more files from the snapshot, the translation component 650 may be configured as or otherwise support a means for transmitting, from the node of the DMS to the in-memory filesystem format translator, one or more requests for access to the one or more files, the one or more requests having the second format and based on the one or more index files. In some examples, to support retrieving the one or more files from the snapshot, the file retrieval component 645 may be configured as or otherwise support a means for retrieving the one or more files based on the one or more requests.

In some examples, to support retrieving the one or more files from the snapshot, the mount component 630 may be configured as or otherwise support a means for accessing, by the DMS, one or more mount points associated with the filesystem, the one or more mount points indicative of one or more locations within the filesystem that are associated with the one or more files, where the one or more mount points are exposed to the DMS within the user space of the node of the DMS. In some examples, to support retrieving the one or more files from the snapshot, the file retrieval component 645 may be configured as or otherwise support a means for retrieving the one or more files from the snapshot based on the one or more mount points.

In some examples, the VM generation component 655 may be configured as or otherwise support a means for generating, based on an image stored to the node of the DMS and after obtaining the snapshot, a first VM within the user space of the node, where the snapshot includes one or more disk files associated with a second VM that stores the filesystem. In some examples, to mount the snapshot within the user space, the mount component 630 may be configured as or otherwise support a means for mounting, to the first VM based on generating the first VM within the user space, the one or more disk files associated with the second VM, where the first VM is configured to execute the one or more disk files.

In some examples, the mount component 630 may be configured as or otherwise support a means for mounting, by the DMS in accordance with a random sequence, a set of multiple devices within the user space of the node of the DMS, the set of multiple devices associated with a set of multiple paths within the filesystem. In some examples, the metadata component 660 may be configured as or otherwise support a means for retrieving, from at least one device of the set of multiple devices and based on the mounting of the set of multiple devices in accordance with the random sequence, metadata that indicates a mount point for information associated with the at least one device. In some examples, to mount the snapshot, the mount component 630 may be configured as or otherwise support a means for mounting, to the user space and in accordance with the metadata, one or more devices of the set of multiple devices associated with the set of multiple paths within the filesystem, where the one or more devices are associated with a subset of paths from among the set of multiple paths that is included in the snapshot, and where retrieving the one or more files indicated via the request is further based on the metadata.

In some examples, the mount component 630 may be configured as or otherwise support a means for storing, within a cache associated with the DMS and based on mounting the one or more devices, one or more mount points associated with the one or more devices.

In some examples, to support mounting the snapshot within the user space, the mount component 630 may be configured as or otherwise support a means for retrieving, from a cache associated with the DMS, one or more mount points that indicate locations of one or more paths associated with a subset of files of the filesystem that is included in the snapshot. In some examples, to support mounting the snapshot within the user space, the mount component 630 may be configured as or otherwise support a means for mounting the snapshot within the user space of the node of the DMS based on the one or more mount points, where retrieving the one or more files indicated via the request is further based on the one or more mount points.

In some examples, to support generating the one or more index files that index the filesystem, the index component 635 may be configured as or otherwise support a means for scanning, within the user space, the snapshot based on the mounting, where scanning the snapshot includes reading a set of multiple files of the filesystem. In some examples, to support generating the one or more index files that index the filesystem, the metadata component 660 may be configured as or otherwise support a means for retrieving, based on scanning the snapshot, metadata from the set of multiple files, the metadata including information associated with types of data stored in the set of multiple files, a location of the set of multiple files, or both. In some examples, to support generating the one or more index files that index the filesystem, the index component 635 may be configured as or otherwise support a means for generating the one or more index files based on the metadata.

In some examples, to support generating the one or more index files that index the filesystem, the index component 635 may be configured as or otherwise support a means for reading, within the user space, one or more blocks included in the snapshot, the one or more blocks including metadata associated with the filesystem, where the one or more blocks are distributed sparsely within the snapshot. In some examples, to support generating the one or more index files that index the filesystem, the index component 635 may be configured as or otherwise support a means for generating, based on the metadata, information that indicates a set of multiple files within the filesystem, types of data stored in the set of multiple files, locations of the set of multiple files, or any combination thereof. In some examples, to support generating the one or more index files that index the filesystem, the index component 635 may be configured as or otherwise support a means for generating the one or more index files based on the information.

Figure 7:
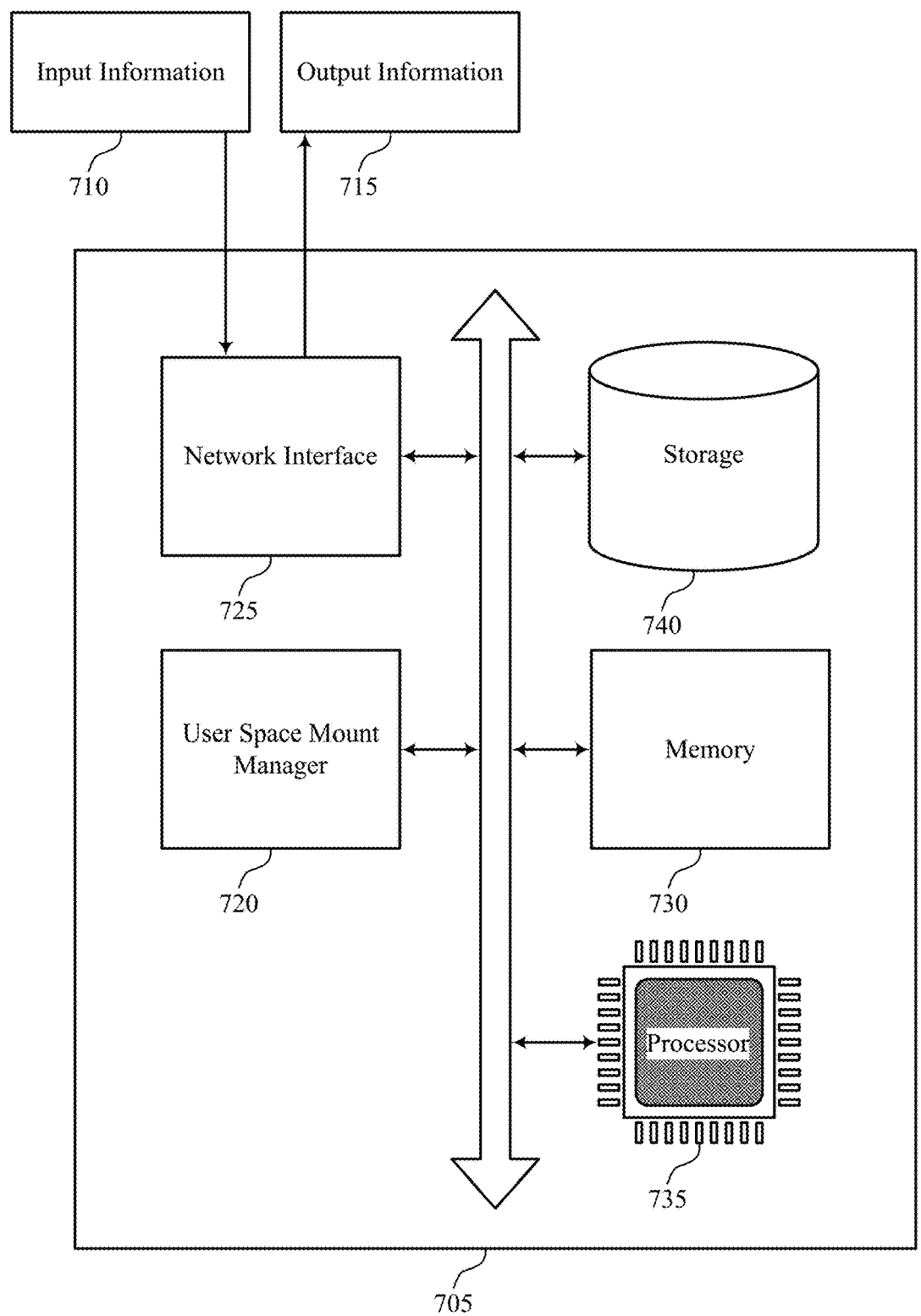
FIG. 7 shows a diagram of a system including a device that supports filesystem recovery and indexing within a user space in accordance with aspects of the present disclosure.

FIG. 7 shows a block diagram 700 of a system 705 that supports filesystem recovery and indexing within a user space in accordance with aspects of the present disclosure. The system 705 may be an example of or include components of a system 505 as described herein. The system 705 may include components for data management, including components such as a user space mount manager 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more VMs). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting filesystem recovery and indexing within a user space). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the user space mount manager 720 may be configured as or otherwise support a means for obtaining, by a DMS, a snapshot of a filesystem, where the DMS supports backup and recovery of the filesystem based on the snapshot. The user space mount manager 720 may be configured as or otherwise support a means for mounting, by the DMS, the snapshot within a user space of a node of the DMS, where the user space is isolated from one or more other processes that execute on the node of the DMS. The user space mount manager 720 may be configured as or otherwise support a means for generating, by the DMS within the user space and based on the snapshot mounted in the user space, one or more index files that index the filesystem. The user space mount manager 720 may be configured as or otherwise support a means for receiving, by the DMS, a request to access one or more files of the filesystem. The user space mount manager 720 may be configured as or otherwise support a means for retrieving, by the DMS, the one or more files indicated via the request from the snapshot based on the one or more index files.

By including or configuring the user space mount manager 720 in accordance with examples as described herein, the system 705 may support techniques for filesystem recovery and indexing within a user space, which may provide one or more benefits such as, for example, improved reliability, reduced latency, improved user experience, reduced power consumption, or more efficient utilization of computing resources, network resources or both for indexing filesystems, among other possibilities.

Figure 8:
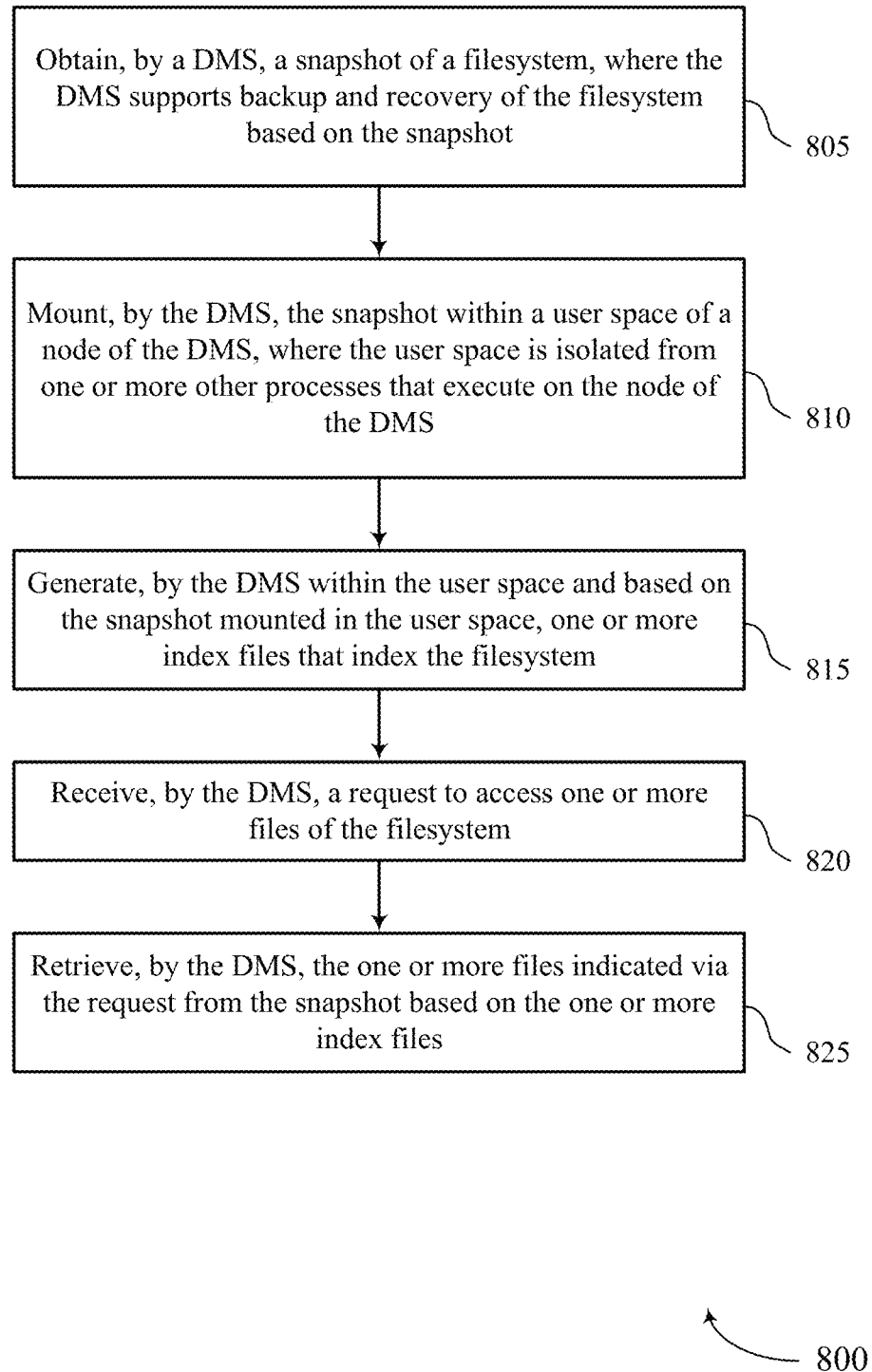
FIGS. 8 through 10 show flowcharts illustrating methods that support filesystem recovery and indexing within a user space in accordance with aspects of the present disclosure.

FIG. 8 shows a flowchart illustrating a method 800 that supports filesystem recovery and indexing within a user space in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include obtaining, by a DMS, a snapshot of a filesystem, where the DMS supports backup and recovery of the filesystem based on the snapshot. The operations of 805 may be performed in accordance with examples as disclosed herein. In some examples, aspects of the operations of 805 may be performed by a snapshot component 625 as described with reference to FIG. 6.

At 810, the method may include mounting, by the DMS, the snapshot within a user space of a node of the DMS, where the user space is isolated from one or more other processes that execute on the node of the DMS. The operations of 810 may be performed in accordance with examples as disclosed herein. In some examples, aspects of the operations of 810 may be performed by a mount component 630 as described with reference to FIG. 6.

At 815, the method may include generating, by the DMS within the user space and based on the snapshot mounted in the user space, one or more index files that index the filesystem. The operations of 815 may be performed in accordance with examples as disclosed herein. In some examples, aspects of the operations of 815 may be performed by an index component 635 as described with reference to FIG. 6.

At 820, the method may include receiving, by the DMS, a request to access one or more files of the filesystem. The operations of 820 may be performed in accordance with examples as disclosed herein. In some examples, aspects of the operations of 820 may be performed by a request component 640 as described with reference to FIG. 6.

At 825, the method may include retrieving, by the DMS, the one or more files indicated via the request from the snapshot based on the one or more index files. The operations of 825 may be performed in accordance with examples as disclosed herein. In some examples, aspects of the operations of 825 may be performed by a file retrieval component 645 as described with reference to FIG. 6.

Figure 9:
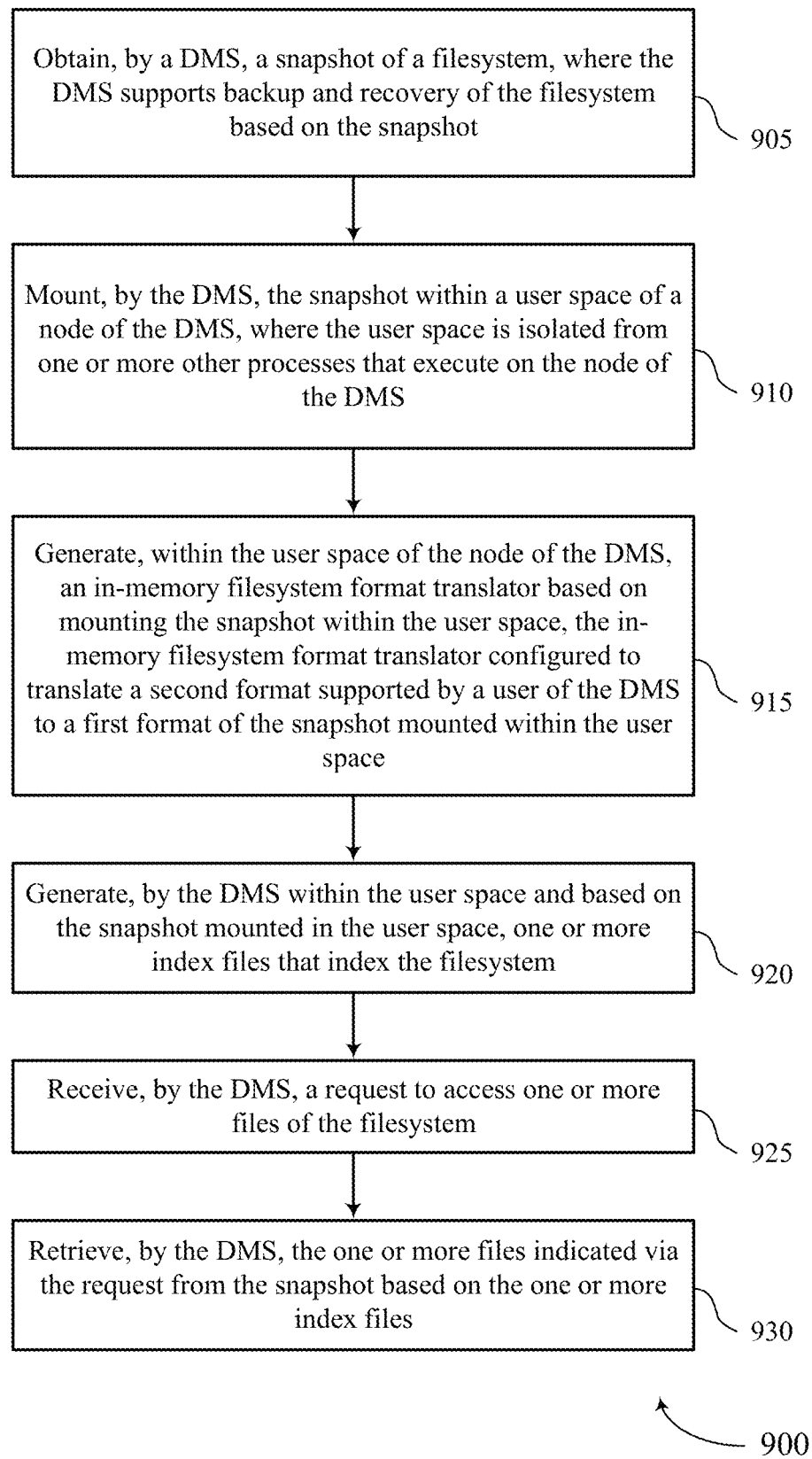

FIG. 9 shows a flowchart illustrating a method 900 that supports filesystem recovery and indexing within a user space in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include obtaining, by a DMS, a snapshot of a filesystem, where the DMS supports backup and recovery of the filesystem based on the snapshot. The operations of 905 may be performed in accordance with examples as disclosed herein. In some examples, aspects of the operations of 905 may be performed by a snapshot component 625 as described with reference to FIG. 6.

At 910, the method may include mounting, by the DMS, the snapshot within a user space of a node of the DMS, where the user space is isolated from one or more other processes that execute on the node of the DMS. The operations of 910 may be performed in accordance with examples as disclosed herein. In some examples, aspects of the operations of 910 may be performed by a mount component 630 as described with reference to FIG. 6.

At 915, the method may include generating, within the user space of the node of the DMS, an in-memory filesystem format translator based on mounting the snapshot within the user space, the in-memory filesystem format translator configured to translate a second format supported by a user of the DMS to a first format of the snapshot mounted within the user space. The operations of 915 may be performed in accordance with examples as disclosed herein. In some examples, aspects of the operations of 915 may be performed by a translation component 650 as described with reference to FIG. 6.

At 920, the method may include generating, by the DMS within the user space and based on the snapshot mounted in the user space, one or more index files that index the filesystem. The operations of 920 may be performed in accordance with examples as disclosed herein. In some examples, aspects of the operations of 920 may be performed by an index component 635 as described with reference to FIG. 6.

At 925, the method may include receiving, by the DMS, a request to access one or more files of the filesystem. The operations of 925 may be performed in accordance with examples as disclosed herein. In some examples, aspects of the operations of 925 may be performed by a request component 640 as described with reference to FIG. 6.

At 930, the method may include retrieving, by the DMS, the one or more files indicated via the request from the snapshot based on the one or more index files. The operations of 930 may be performed in accordance with examples as disclosed herein. In some examples, aspects of the operations of 930 may be performed by a file retrieval component 645 as described with reference to FIG. 6.

Figure 10:
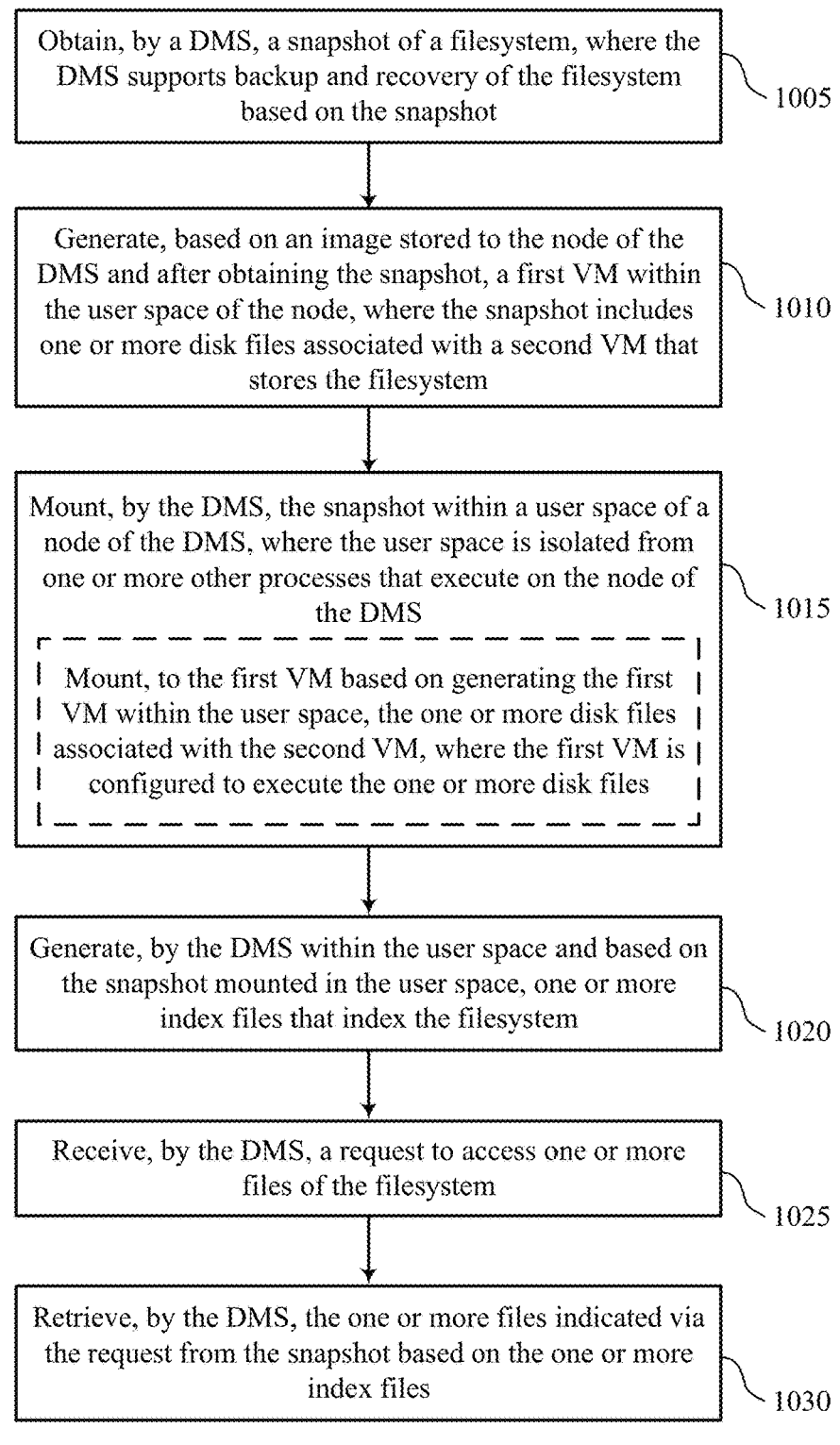

FIG. 10 shows a flowchart illustrating a method 1000 that supports filesystem recovery and indexing within a user space in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, by a DMS, a snapshot of a filesystem, where the DMS supports backup and recovery of the filesystem based on the snapshot. The operations of 1005 may be performed in accordance with examples as disclosed herein. In some examples, aspects of the operations of 1005 may be performed by a snapshot component 625 as described with reference to FIG. 6.

At 1010, the method may include generating, based on an image stored to the node of the DMS and after obtaining the snapshot, a first VM within the user space of the node, where the snapshot includes one or more disk files associated with a second VM that stores the filesystem. The operations of 1010 may be performed in accordance with examples as disclosed herein. In some examples, aspects of the operations of 1010 may be performed by a VM generation component 655 as described with reference to FIG. 6.

At 1015, the method may include mounting, by the DMS, the snapshot within a user space of a node of the DMS, where the user space is isolated from one or more other processes that execute on the node of the DMS. In some examples, mounting the snapshot within the user space may include mounting, to the first VM based on generating the first VM within the user space, the one or more disk files associated with the second VM, where the first VM is configured to execute the one or more disk files. The operations of 1015 may be performed in accordance with examples as disclosed herein. In some examples, aspects of the operations of 1015 may be performed by a mount component 630 as described with reference to FIG. 6.

At 1020, the method may include generating, by the DMS within the user space and based on the snapshot mounted in the user space, one or more index files that index the filesystem. The operations of 1020 may be performed in accordance with examples as disclosed herein. In some examples, aspects of the operations of 1020 may be performed by an index component 635 as described with reference to FIG. 6.

At 1025, the method may include receiving, by the DMS, a request to access one or more files of the filesystem. The operations of 1025 may be performed in accordance with examples as disclosed herein. In some examples, aspects of the operations of 1025 may be performed by a request component 640 as described with reference to FIG. 6.

At 1030, the method may include retrieving, by the DMS, the one or more files indicated via the request from the snapshot based on the one or more index files. The operations of 1030 may be performed in accordance with examples as disclosed herein. In some examples, aspects of the operations of 1030 may be performed by a file retrieval component 645 as described with reference to FIG. 6.

A method by an apparatus is described. The method may include obtaining, by a DMS, a snapshot of a filesystem, where the DMS supports backup and recovery of the filesystem based on the snapshot, mounting, by the DMS, the snapshot within a user space of a node of the DMS, where the user space is isolated from one or more other processes that execute on the node of the DMS, generating, by the DMS within the user space and based on the snapshot mounted in the user space, one or more index files that index the filesystem, receiving, by the DMS, a request to access one or more files of the filesystem, and retrieving, by the DMS, the one or more files indicated via the request from the snapshot based on the one or more index files.

An apparatus is described. The apparatus may include one or more memories storing processor executable code, and one or more processors coupled with the one or more memories. The one or more processors may individually or collectively be operable to execute the code to cause the apparatus to obtain, by a DMS, a snapshot of a filesystem, where the DMS supports backup and recovery of the filesystem based on the snapshot, mount, by the DMS, the snapshot within a user space of a node of the DMS, where the user space is isolated from one or more other processes that execute on the node of the DMS, generate, by the DMS within the user space and based on the snapshot mounted in the user space, one or more index files that index the filesystem, receive, by the DMS, a request to access one or more files of the filesystem, and retrieve, by the DMS, the one or more files indicated via the request from the snapshot based on the one or more index files.

Another apparatus is described. The apparatus may include means for obtaining, by a DMS, a snapshot of a filesystem, where the DMS supports backup and recovery of the filesystem based on the snapshot, means for mounting, by the DMS, the snapshot within a user space of a node of the DMS, where the user space is isolated from one or more other processes that execute on the node of the DMS, means for generating, by the DMS within the user space and based on the snapshot mounted in the user space, one or more index files that index the filesystem, means for receiving, by the DMS, a request to access one or more files of the filesystem, and means for retrieving, by the DMS, the one or more files indicated via the request from the snapshot based on the one or more index files.

A non-transitory computer-readable medium storing code is described. The code may include instructions executable by one or more processors to obtain, by a DMS, a snapshot of a filesystem, where the DMS supports backup and recovery of the filesystem based on the snapshot, mount, by the DMS, the snapshot within a user space of a node of the DMS, where the user space is isolated from one or more other processes that execute on the node of the DMS, generate, by the DMS within the user space and based on the snapshot mounted in the user space, one or more index files that index the filesystem, receive, by the DMS, a request to access one or more files of the filesystem, and retrieve, by the DMS, the one or more files indicated via the request from the snapshot based on the one or more index files.

Some examples of the method, apparatus, and non-transitory computer-readable medium described herein may further include operations, features, means, or instructions for generating, within the user space of the node of the DMS, an in-memory filesystem format translator based on mounting the snapshot within the user space, the in-memory filesystem format translator configured to translate a second format supported by a user of the DMS to a first format of the snapshot mounted within the user space.

In some examples of the method, apparatus, and non-transitory computer-readable medium described herein, operations, features, means, or instructions for mounting the snapshot within the user space of the node of the DMS may include operations, features, means, or instructions for mounting the snapshot within the user space of the node of the DMS in accordance with one or more interfaces configured to facilitate the mounting, where the first format may be associated with the one or more interfaces.

In some examples of the method, apparatus, and non-transitory computer-readable medium described herein, operations, features, means, or instructions for retrieving the one or more files from the snapshot may include operations, features, means, or instructions for transmitting, from the node of the DMS to the in-memory filesystem format translator, one or more requests for access to the one or more files, the one or more requests having the second format and based on the one or more index files, and retrieving the one or more files based on the one or more requests.

In some examples of the method, apparatus, and non-transitory computer-readable medium described herein, operations, features, means, or instructions for retrieving the one or more files from the snapshot may include operations, features, means, or instructions for accessing, by the DMS, one or more mount points associated with the filesystem, the one or more mount points indicative of one or more locations within the filesystem that may be associated with the one or more files, where the one or more mount points may be exposed to the DMS within the user space of the node of the DMS, and retrieving the one or more files from the snapshot based on the one or more mount points.

Some examples of the method, apparatus, and non-transitory computer-readable medium described herein may further include operations, features, means, or instructions for generating, based on an image stored to the node of the DMS and after obtaining the snapshot, a first VM within the user space of the node, where the snapshot includes one or more disk files associated with a second VM that stores the filesystem, and where operations, features, means, or instructions for mounting the snapshot within the user space include operations, features, means, or instructions for mounting, to the first VM based on generating the first VM within the user space, the one or more disk files associated with the second VM, where the first VM may be configured to execute the one or more disk files.

Some examples of the method, apparatus, and non-transitory computer-readable medium described herein may further include operations, features, means, or instructions for mounting, by the DMS in accordance with a random sequence, a set of multiple devices within the user space of the node of the DMS, the set of multiple devices associated with a set of multiple paths within the filesystem and retrieving, from at least one device of the set of multiple devices and based on the mounting of the set of multiple devices in accordance with the random sequence, metadata that indicates a mount point for information associated with the at least one device, where operations, features, means, or instructions for mounting the snapshot include operations, features, means, or instructions for mounting, to the user space and in accordance with the metadata, one or more devices of the set of multiple devices associated with the set of multiple of paths within the filesystem, where the one or more devices are associated with a subset of paths from among the set of multiple of paths that is included in the snapshot, and where retrieving the one or more files indicated via the request is further based on the metadata.

Some examples of the method, apparatus, and non-transitory computer-readable medium described herein may further include operations, features, means, or instructions for storing, within a cache associated with the DMS and based on mounting the one or more devices, one or more mount points associated with the one or more devices.

In some examples of the method, apparatus, and non-transitory computer-readable medium described herein, operations, features, means, or instructions for mounting the snapshot within the user space may include operations, features, means, or instructions for retrieving, from a cache associated with the DMS, one or more mount points that indicate locations of one or more paths associated with a subset of files of the filesystem that may be included in the snapshot and mounting the snapshot within the user space of the node of the DMS based on the one or more mount points, where retrieving the one or more files indicated via the request may be further based on the one or more mount points.

In some examples of the method, apparatus, and non-transitory computer-readable medium described herein, operations, features, means, or instructions for generating the one or more index files that index the filesystem may include operations, features, means, or instructions for scanning, within the user space, the snapshot based on the mounting, where scanning the snapshot includes reading a set of multiple files of the filesystem, retrieving, based on scanning the snapshot, metadata from the set of multiple files, the metadata including information associated with types of data stored in the set of multiple files, a location of the set of multiple files, or both, and generating the one or more index files based on the metadata.

In some examples of the method, apparatus, and non-transitory computer-readable medium described herein, operations, features, means, or instructions for generating the one or more index files that index the filesystem may include operations, features, means, or instructions for reading, within the user space, one or more blocks included in the snapshot, the one or more blocks including metadata associated with the filesystem, where the one or more blocks may be distributed sparsely within the snapshot, generating, based on the metadata, information that indicates a set of multiple files within the filesystem, types of data stored in the set of multiple files, locations of the set of multiple files, or any combination thereof, and generating the one or more index files based on the information.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   obtaining, by a data management system, a snapshot of a filesystem, wherein the data management system supports backup and recovery of the filesystem based at least in part on the snapshot;
   mounting, by the data management system, the snapshot within a user space of a node of the data management system, wherein the user space is isolated from one or more other processes that execute on the node of the data management system;
   generating, by the data management system within the user space and based at least in part on the snapshot mounted in the user space, one or more index files that index the filesystem;
   receiving, by the data management system, a request to access one or more files of the filesystem; and
   retrieving, by the data management system, the one or more files indicated via the request from the snapshot based at least in part on the one or more index files.

2. The method of claim 1 further comprising:
   generating, within the user space of the node of the data management system, an in-memory filesystem format translator based at least in part on mounting the snapshot within the user space, the in-memory filesystem format translator configured to translate a second format supported by a user of the data management system to a first format of the snapshot mounted within the user space.

3. The method of claim 2, wherein mounting the snapshot within the user space of the node of the data management system comprises:
   mounting the snapshot within the user space of the node of the data management system in accordance with one or more interfaces configured to facilitate the mounting, wherein the first format is associated with the one or more interfaces.

4. The method of claim 2, wherein retrieving the one or more files from the snapshot comprises:
   transmitting, from the node of the data management system to the in-memory filesystem format translator, one or more requests for access to the one or more files, the one or more requests having the second format and based at least in part on the one or more index files; and
   retrieving the one or more files based at least in part on the one or more requests.

5. The method of claim 1 wherein retrieving the one or more files from the snapshot comprises:
   accessing, by the data management system, one or more mount points associated with the filesystem, the one or more mount points indicative of one or more locations within the filesystem that are associated with the one or more files, wherein the one or more mount points are exposed to the data management system within the user space of the node of the data management system; and
   retrieving the one or more files from the snapshot based at least in part on the one or more mount points.

6. The method of claim 1 further comprising:
   generating, based at least in part on an image stored to the node of the data management system and after obtaining the snapshot, a first virtual machine within the user space of the node, wherein the snapshot comprises one or more disk files associated with a second virtual machine that stores the filesystem, and wherein mounting the snapshot within the user space comprises:
      mounting, to the first virtual machine based at least in part on generating the first virtual machine within the user space, the one or more disk files associated with the second virtual machine, wherein the first virtual machine is configured to execute the one or more disk files.

7. The method of claim 1 further comprising:
   mounting, by the data management system in accordance with a random sequence, a plurality of devices within the user space of the node of the data management system, the plurality of devices associated with a plurality of paths within the filesystem; and
   retrieving, from at least one device of the plurality of devices and based at least in part on the mounting of the plurality of devices in accordance with the random sequence, metadata that indicates a mount point for information associated with the at least one device, wherein mounting the snapshot comprises:
      mounting, to the user space and in accordance with the metadata, one or more devices of the plurality of devices associated with the plurality of paths within the filesystem, wherein the one or more devices are associated with a subset of paths from among the plurality of paths that is included in the snapshot, and wherein retrieving the one or more files indicated via the request is further based at least in part on the metadata.

8. The method of claim 7, further comprising:
   storing, within a cache associated with the data management system and based at least in part on mounting the one or more devices, one or more mount points associated with the one or more devices.

9. The method of claim 1 wherein mounting the snapshot within the user space comprises:
   retrieving, from a cache associated with the data management system, one or more mount points that indicate locations of one or more paths associated with a subset of files of the filesystem that is included in the snapshot; and
   mounting the snapshot within the user space of the node of the data management system based at least in part on the one or more mount points, wherein retrieving the one or more files indicated via the request is further based at least in part on the one or more mount points.

10. The method of claim 1 wherein generating the one or more index files that index the filesystem comprises:
    scanning, within the user space, the snapshot based at least in part on the mounting, wherein scanning the snapshot comprises reading a plurality of files of the filesystem;
    retrieving, based at least in part on scanning the snapshot, metadata from the plurality of files, the metadata comprising information associated with types of data stored in the plurality of files, a location of the plurality of files, or both; and generating the one or more index files based at least in part on the metadata.

11. The method of claim 1 wherein generating the one or more index files that index the filesystem comprises:

reading, within the user space, one or more blocks included in the snapshot, the one or more blocks comprising metadata associated with the filesystem, wherein the one or more blocks are distributed sparsely within the snapshot;

generating, based at least in part on the metadata, information that indicates a plurality of files within the filesystem, types of data stored in the plurality of files, locations of the plurality of files, or any combination thereof; and generating the one or more index files based at least in part on the information.

12. An apparatus, comprising:

one or more memories storing processor-executable code; and one or more processors coupled with the one or more memories and individually or collectively operable to execute the code to cause the apparatus to:

obtain, by a data management system, a snapshot of a filesystem, wherein the data management system supports backup and recovery of the filesystem based at least in part on the snapshot;

mount, by the data management system, the snapshot within a user space of a node of the data management system, wherein the user space is isolated from one or more other processes that execute on the node of the data management system;

generate, by the data management system within the user space and based at least in part on the snapshot mounted in the user space, one or more index files that index the filesystem;

receive, by the data management system, a request to access one or more files of the filesystem; and retrieve, by the data management system, the one or more files indicated via the request from the snapshot based at least in part on the one or more index files.

13. The apparatus of claim 12, wherein the one or more processors are individually or collectively further operable to execute the code to cause the apparatus to:

generate, within the user space of the node of the data management system, an in-memory filesystem format translator based at least in part on mounting the snapshot within the user space, the in-memory filesystem format translator configured to translate a second format supported by a user of the data management system to a first format of the snapshot within the user space.

14. The apparatus of claim 13, wherein, to mount the snapshot within the user space of the node of the data management system, the one or more processors are individually or collectively operable to execute the code to cause the apparatus to:

mount the snapshot within the user space of the node of the data management system in accordance with one or more interfaces configured to facilitate the mounting, wherein the first format is associated with the one or more interfaces.

15. The apparatus of claim 13, wherein, to retrieve the one or more files from the snapshot, the one or more processors are individually or collectively operable to execute the code to cause the apparatus to:

transmit, from the node of the data management system to the in-memory filesystem format translator, one or more requests for access to the one or more files, the one or more requests having the second format and based at least in part on the one or more index files; and retrieve the one or more files based at least in part on the one or more requests.

16. The apparatus of claim 12, wherein, to retrieve the one or more files from the snapshot, the one or more processors are individually or collectively operable to execute the code to cause the apparatus to:

access, by the data management system, one or more mount points associated with the filesystem, the one or more mount points indicative of one or more locations within the filesystem that are associated with the one or more files, wherein the one or more mount points are exposed to the data management system within the user space of the node of the data management system; and retrieve the one or more files from the snapshot based at least in part on the one or more mount points.

17. The apparatus of claim 12, wherein the one or more processors are individually or collectively further operable to execute the code to cause the apparatus to:

generate, based at least in part on an image stored to the node of the data management system and after obtaining the snapshot, a first virtual machine within the user space of the node, wherein the snapshot comprises one or more disk files associated with a second virtual machine that stores the filesystem, and wherein, to mount the snapshot within the user space, the one or more processors are individually or collectively operable to execute the code to cause the apparatus to:

mount, to the first virtual machine based at least in part on generating the first virtual machine within the user space, the one or more disk files associated with the second virtual machine, wherein the first virtual machine is configured to execute the one or more disk files.

18. The apparatus of claim 12, wherein the one or more processors are individually or collectively further operable to execute the code to cause the apparatus to:

mount, by the data management system in accordance with a random sequence, a plurality of devices within the user space of the node of the data management system, the plurality of devices associated with a plurality of paths within the filesystem; and retrieve, from at least one device of the plurality of devices and based at least in part on the mounting of the plurality of devices in accordance with the random sequence, metadata that indicates a mount point for information associated with the at least one device, wherein, to mount the snapshot, the one or more processors are individually or collectively operable to execute the code to cause the apparatus to:

mount, to the user space and in accordance with the metadata, one or more devices of the plurality of devices associated with the plurality of paths within the filesystem, wherein the one or more devices are associated with a subset of paths from among the plurality of paths that is included in the snapshot, and wherein retrieving the one or more files indicated via the request is further based at least in part on the metadata.

19. A non-transitory computer-readable medium storing code, the code comprising instructions executable by one or more processors to:

obtain, by a data management system, a snapshot of a filesystem, wherein the data management system supports backup and recovery of the filesystem based at least in part on the snapshot;

mount, by the data management system, the snapshot within a user space of a node of the data management system, wherein the user space is isolated from one or more other processes that execute on the node of the data management system;

generate, by the data management system within the user space and based at least in part on the snapshot mounted in the user space, one or more index files that index the filesystem;

receive, by the data management system, a request to access one or more files of the filesystem; and retrieve, by the data management system, the one or more files indicated via the request from the snapshot based at least in part on the one or more index files.

20. The non-transitory computer-readable medium of claim 19, wherein the code comprises instructions that are further executable by the one or more processors to:

generate, within the user space of the node of the data management system, an in-memory filesystem format translator based at least in part on mounting the snapshot within the user space, the in-memory filesystem format translator configured to translate a second format supported by a user of the data management system to a first format of the snapshot within the user space.

* * * * *